(12) United States Patent
Charcosset et al.

(10) Patent No.: US 10,239,080 B2
(45) Date of Patent: Mar. 26, 2019

(54) DISPENSING DEVICE FOR AGRICULTURAL SPRAYER

(71) Applicant: Exel Industries, Paris (FR)

(72) Inventors: Philippe Charcosset, Monsol (FR); Yves Carra, Saint Bel (FR)

(73) Assignee: EXEL INDUSTRIES, Paris (FR)

( * ) Notice: Subject to any disclaimer, the term of this patent is extended or adjusted under 35 U.S.C. 154(b) by 0 days.

(21) Appl. No.: 15/667,898

(22) Filed: Aug. 3, 2017

(65) Prior Publication Data

US 2017/0326570 A1 Nov. 16, 2017

Related U.S. Application Data

(63) Continuation of application No. PCT/FR2016/050224, filed on Feb. 3, 2016.

(30) Foreign Application Priority Data

Feb. 3, 2015 (FR) ...................................... 15 50836

(51) Int. Cl.
| | |
|---|---|
| B05B 12/00 | (2018.01) |
| B05B 12/14 | (2006.01) |
| A01M 7/00 | (2006.01) |
| B05B 9/04 | (2006.01) |
| F04B 41/02 | (2006.01) |
| B05B 9/00 | (2006.01) |

(52) U.S. Cl.
CPC ........... *B05B 12/1472* (2013.01); *A01M 7/00* (2013.01); *B05B 9/0423* (2013.01); *F04B 41/02* (2013.01); *B05B 9/00* (2013.01); *B05B 12/00* (2013.01); *B05B 12/149* (2013.01)

(58) Field of Classification Search
None
See application file for complete search history.

(56) References Cited

U.S. PATENT DOCUMENTS

| | | | | |
|---|---|---|---|---|
| 1,814,907 A | * | 7/1931 | Dugan | .................... F16N 25/04 |
| | | | | 137/553 |
| 3,458,133 A | * | 7/1969 | Wiggins | .................. B05B 12/14 |
| | | | | 239/112 |
| 3,654,817 A | * | 4/1972 | Kane | ..................... B05B 3/0454 |
| | | | | 239/236 |

(Continued)

FOREIGN PATENT DOCUMENTS

| | | |
|---|---|---|
| EP | 1790891 | 5/2007 |
| FR | 2515989 | 5/1983 |

OTHER PUBLICATIONS

International Search Report for International Application PCT/FR2016/050224 dated May 17, 2016.

*Primary Examiner* — Viet Le
(74) *Attorney, Agent, or Firm* — Burris Law, PLLC

(57) ABSTRACT

The present disclosure relates to a dispensing device for an agricultural sprayer. The dispensing device includes a supply manifold having at least two inlets, each inlet connectable to a product source and engaging with a closing valve, and a dispensing manifold having at least two outlets, each outlet connectable to at least one spraying member and engages with a closing valve. The dispensing device further includes a control mechanism that includes at least one camshaft having a plurality of cams. Each cam controls the opening and closing of an associated valve.

6 Claims, 2 Drawing Sheets

(56) References Cited

U.S. PATENT DOCUMENTS

Figure 1:
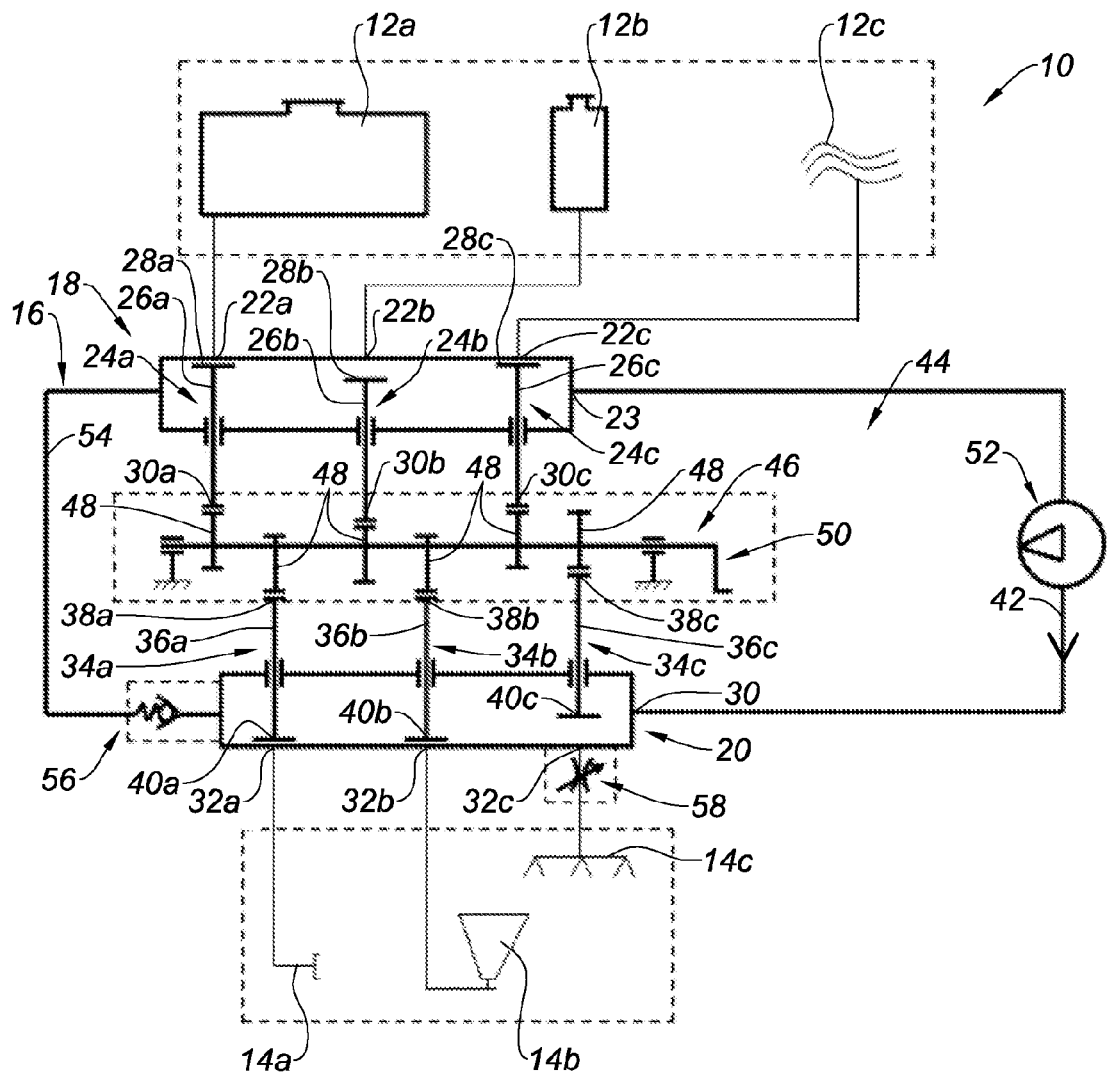

| | | | | |
|---|---|---|---|---|
| 4,047,587 A * | 9/1977 | Anstey | B60K 25/00 | 180/315 |
| 4,278,205 A * | 7/1981 | Binoche | B05B 9/03 | 239/75 |
| 4,836,458 A * | 6/1989 | Cavagna | B26D 7/2635 | 241/101.2 |
| 5,103,852 A * | 4/1992 | Jones | B67D 7/3218 | 137/71 |
| 5,794,849 A * | 8/1998 | Elder | A01G 25/023 | 239/99 |
| 6,032,922 A * | 3/2000 | Shew | F16K 31/52433 | 239/526 |
| 6,199,976 B1 * | 3/2001 | Sasada | B41J 2/1707 | 347/85 |
| 6,523,453 B2 * | 2/2003 | Sedoni | F15B 13/0402 | 137/596.2 |
| 7,281,785 B2 * | 10/2007 | Palifka | B41J 2/175 | 347/85 |
| 7,798,424 B2 * | 9/2010 | Lin | A61L 9/14 | 222/129 |
| 8,807,717 B2 * | 8/2014 | Ishizawa | B41J 2/175 | 347/84 |
| 9,132,438 B2 * | 9/2015 | Fraser | B05B 1/185 | |
| 9,227,207 B1 * | 1/2016 | Bredberg | A01G 25/00 | |
| 9,427,129 B2 * | 8/2016 | Butts | A47L 13/22 | |
| 2005/0034658 A1 * | 2/2005 | Palifka | B41J 2/175 | 118/313 |
| 2007/0138313 A1 * | 6/2007 | Corona | F16K 31/383 | 239/14.2 |
| 2008/0123466 A1 * | 5/2008 | Thompson | B01F 11/0042 | 1/42 |
| 2008/0276906 A1 * | 11/2008 | Thomas | F02D 41/2438 | 123/457 |
| 2010/0037862 A1 * | 2/2010 | Millet | F02M 45/12 | 123/447 |
| 2010/0087792 A1 * | 4/2010 | Nielsen | A61M 3/0295 | 604/328 |
| 2011/0239384 A1 * | 10/2011 | Wilkins | B08B 1/04 | 15/24 |
| 2014/0263711 A1 * | 9/2014 | Fraser | B05B 1/185 | 239/11 |
| 2015/0182103 A1 * | 7/2015 | Jung | A47L 15/4282 | 134/182 |
| 2015/0225259 A1 * | 8/2015 | Yamaoka | C02F 1/42 | 137/865 |
| 2015/0330343 A1 * | 11/2015 | Stroia | F02M 51/0603 | 239/585.1 |
| 2016/0116079 A1 * | 4/2016 | Hoppe | F01L 1/344 | 251/129.01 |
| 2016/0222950 A1 * | 8/2016 | Kawamori | F04B 17/03 | |
| 2017/0326570 A1 * | 11/2017 | Charcosset | B05B 12/1472 | |

* cited by examiner

_US 10,239,080 B2_

DISPENSING DEVICE FOR AGRICULTURAL SPRAYER

CROSS-REFERENCE TO RELATED APPLICATIONS

This application is a continuation of International Application No. PCT/FR2016/050224, filed on Feb. 3, 2016, which claims priority to and the benefit of French Application No. FR 1550836 filed on Feb. 3, 2015. The disclosures of the above applications are incorporated herein by reference.

FIELD

The present disclosure relates to a distribution device for an agricultural sprayer.

BACKGROUND

The statements in this section merely provide background information related to the present disclosure and may not constitute prior art.

It is known a type of spraying system which includes an agricultural sprayer associated with a plurality of sources of products to be sprayed, generally products in liquid form.

This spraying system is equipped with a plurality of spraying members which are each adapted to spray at least one product coming from the different sources.

Also, the system includes multi-way gates which are actuated by the operator to link and associate one of the product sources on one of the spraying members, according to the selected position of the gates.

With this type of spraying system, there is a risk of inadvertently linking one of the product sources with a spraying member not adapted to this product.

SUMMARY

The present disclosure relates to a distribution device for an agricultural sprayer, the sprayer being associated with a plurality of product sources and with a plurality of spraying members, the device being characterized in that it includes:

a supply manifold having at least two inlets and at least one outlet, each inlet being adapted to be linked on one of said product sources and each inlet cooperating with a closing valve, a distribution manifold having at least one inlet and at least two outlets, each outlet being adapted to be linked on one of said spraying members and each outlet cooperating with a closing valve, a distribution conduit which links the outlet of the supply manifold on the inlet of the distribution manifold, a control mechanism which includes at least one camshaft carrying a plurality of cams, each cam acting on the opening and the closing of one of said valves, the camshaft being rotatably mounted between several angular positions in each of which the valves allow the supply of one of said spraying members by at least one of said product sources, and an actuating device for actuating the camshaft.

Thus, the present disclosure allows decreasing risk of bad manipulation by mechanically linking each product source to a spraying member.

According to another characteristic, the control mechanism includes a first camshaft which carries at least two cams each acting on one of said associated valves of the supply manifold, and a second camshaft which carries at least two cams each acting on one of said associated valves of the supply manifold, the first shaft being rotatably linked on the second shaft by a disengageable coupling system.

This characteristic allows driving in rotation the first camshaft independently of the second camshaft, which allows in particular changing the initial attribution of the product sources to the spraying members.

In addition, the distribution conduit is equipped with a circulation pump designed to allow the flow of the products from said sources up to said spraying members.

According to a variant, the supply manifold and the distribution manifold form an integral part of the circulation pump.

Also, the device includes a safety conduit which links the supply manifold on the distribution manifold and which is equipped with a safety valve.

Finally, this form includes at least one regulating device for regulating the flow rate of the product.

Further areas of applicability will become apparent from the description provided herein. It should be understood that the description and specific examples are intended for purposes of illustration only and are not intended to limit the scope of the present disclosure.

DRAWINGS

Figure 2:
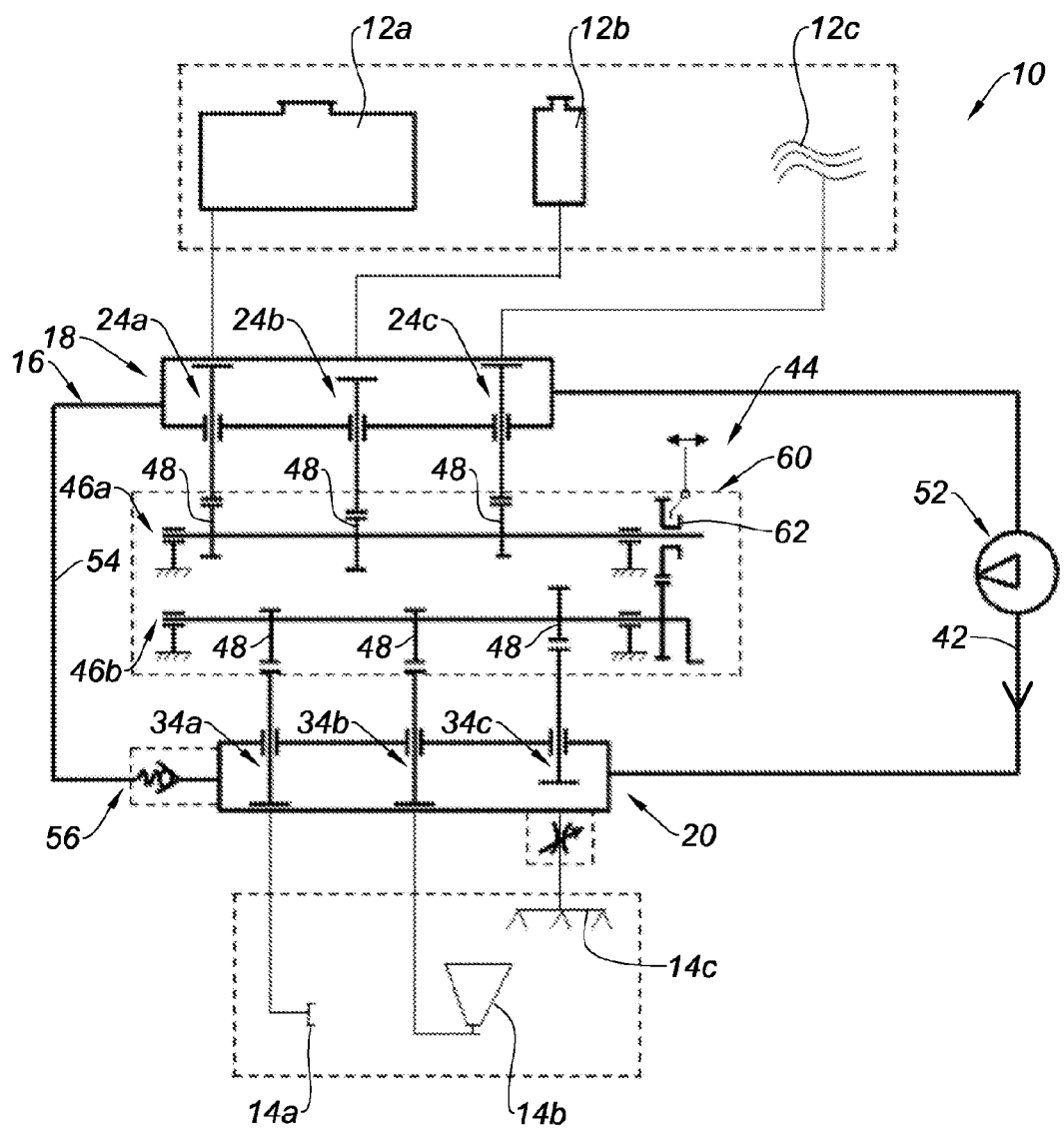

In order that the disclosure may be well understood, there will now be described various forms thereof, given by way of example, reference being made to the accompanying drawings, in which:

FIG. 1 is a schematic view which illustrates a distribution device for an agricultural sprayer including a camshaft for controlling the valves, according to the teachings of the present disclosure; and FIG. 2 is a schematic view which illustrates the device of FIG. 1 including two camshafts for controlling the valves, according to another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an agricultural sprayer 10 which includes three sources of liquid product 12a, 12b, 12c of different nature and three spraying members 14a, 14b, 14c each adapted to spray at least one of the products 12a, 12b, 12c.

The sprayer 10 is equipped with a distribution device 16 which allows selecting an adapted combination of a product source with an associated spraying member 14a, 14b, 14c, knowing that the product sources 12a, 12b, 12c are not all compatible with each spraying member 14a, 14b, 14c.

For this purpose, the distribution device 16 includes a supply manifold 18 which is linked on the product sources 12a, 12b, 12c, and a distribution manifold 20 which is linked on the spraying members 14a, 14b, 14c.

The supply manifold 18 has three inputs 22a, 22b, 22c and an output 23, the inputs 22a, 22b, 22c being linked on the product sources 12a, 12b, 12c respectively.

In addition, each inlet 22a, 22b, 22c of the supply manifold 18 cooperates with a closing valve 24a, 24b, 24c respectively.

Each valve 24a, 24b, 24c includes an axial actuating rod 26a, 26b, 26c which is provided with a head 28a, 28b, 28c at a first end and a foot 30a, 30b, 30c at an opposite second end, respectively.

The rod 26a, 26b, 26c of each valve 24a, 24b, 24c is mounted axially slidably on the body of the supply manifold 18, so that each valve 24a, 24b, 24c is movably mounted between an open position in which the head 28a, 28b, 28c allows the passage of the product 12a, 12b, 12c of the associated source through the associated inlet 22a, 22b, 22c of the supply manifold 18, and a closed position in which the head 28a, 28b, 28c obstructs the inlet 22a, 22b, 22c.

Similarly, the distribution manifold 20 has an inlet 30 and three outlets 32a, 32b, 32c, the outlets being linked on the spraying members 14a, 14b, 14c respectively.

In addition, each outlet 32a, 32b, 32c of the distribution manifold 20 cooperates with a closing valve 34a, 34b, 34c respectively.

Each valve 34a, 34b, 34c includes an axial actuating rod 36a, 36b, 36c which is provided with a head 38a, 38b, 38c at one end and a foot 40a, 40b, 40c at an opposite second end, respectively.

The rod 36a, 36b, 36c of each valve 34a, 34b, 34c is mounted axially slidably on the body of the distribution manifold 20, so that each valve 34a, 34b, 34c is movably mounted between an open position in which the head 38a, 38b, 38c allows the passage of the product through the outlet 32a, 32b, 32c of the distribution manifold 20, and a closed position in which the head 38a, 38b, 38c obstructs the outlet 32a, 32b, 32c.

In a complementary manner, a distribution conduit 42 links the outlet 23 of the supply manifold 18 on the inlet 30 of the distribution manifold 20, in order to allow the products to pass from one to the other.

Also, the distribution device 16 is equipped with a control mechanism 44 which is designed to drive in displacement the different valves in order to combine and connect a product source with an adapted spraying member.

According to one form of the present disclosure, shown in FIG. 1, the control mechanism 44 includes a camshaft 46 which carries six cams 48.

Each cam 48 cooperates with the foot of an associated valve 24a, 24b, 24c, 34a, 34b, 34c to drive the associated valve into its open or closed position.

In addition, the camshaft 46 is rotatably mounted between at least three angular positions in each of which the valves allow the supply of one of the spraying members 14a, 14b, 14c by one of the product sources 12a, 12b, 12c.

For this purpose, the three cams 48 which are associated with the three valves 24a, 24b, 24c of the supply manifold 18 are arranged on the camshaft 46 in an angularly offset manner by at least one third of a turn, namely 120 degrees, following the three angular positions of the camshaft 46.

Similarly, the three cams 48 which are associated with the three valves 34a, 34b, 34c of the distribution manifold 20 are arranged on the camshaft 46 in an angularly offset manner by at least one third of turn, namely 120 degrees, following the three angular positions of the camshaft 46.

More particularly, the cams 48 are arranged such that for each angular position of the camshaft 46, one of the three valves 24a, 24b, 24c of the supply manifold 18 is open and one of the three valves 34a, 34b, 34c of the distribution manifold 20 is open to allow the passage of the product from one of the product sources 12a, 12b, 12c, up to one of the associated spraying members 14a, 14b, 14c.

Further, the distribution device includes an actuating device 50 allowing to drive in rotation the camshaft 46, the actuating device 50 is, according to the example described herein, a crank which is linked on the camshaft 46 to drive the camshaft 46 manually between its three positions.

By way of non-restrictive example, the actuating device 50 may also be a motorized device, for example an electric motor which drives the camshaft 46 in rotation.

As can be seen in FIG. 1, the flow of the products 12a, 12b, 12c from their source up to the spraying members 14a, 14b, 14c is provided by a circulation pump 52 which is mounted on the distribution conduit 42.

According to a non shown variant of the present disclosure, the supply manifold 18 and the distribution manifold 20 form an integral part of the circulation pump 52.

According to another aspect of the present disclosure, the distribution device 16 includes a safety conduit 54 which links the supply manifold 18 on the distribution manifold 20 and which is equipped with a safety valve 56 to limit the pressure and protect the device.

In addition, a regulating device 58 for regulating the flow rate of the product is associated with a spraying member 14c.

According to another form of the present disclosure, shown in FIG. 2, the control mechanism 44 includes a first camshaft 46a which carries three cams 48 each cooperating with one of the three valves 24a, 24b, 24c of the supply manifold 18, and a second camshaft 46b which carries three cams 48 each cooperating with one of the three valves 34a, 34b, 34c of the distribution manifold 20.

In this form of the present disclosure, being similar to the form described above, it will only be described succinctly so as not to add to the description unnecessarily.

According to this form, each camshaft 46a, 46b is rotatably mounted between at least three angular positions in each of which the valves allow the supply of one of the spraying members 14a, 14b, 14c by one of the product sources 12a, 12b, 12c.

In addition, the first camshaft 46a is linked in rotation on the second camshaft 46b by a disengageable coupling system 60.

The coupling system 60 is for example constituted by a pinion 62 mounted free in translation on the first camshaft 46a between an engaged drive position of the second camshaft 46b and a disengaged position.

This characteristic allows, when the coupling system 60 is disengaged, to drive in rotation the first camshaft 46a independently of the second camshaft 46b, which allows in particular to change the initial attribution of the product sources 12a, 12b, 12c to the spraying members 14a, 14b, 14c.

The present description of the present disclosure is given by way of non-restrictive example.

Similarly, simple mechanical inversions are covered by the present disclosure, as well as the number of sources of products and spraying members.

It will be understood that the valves may be replaced by any equivalent means allowing opening or closing an orifice, such as a gate or a flap.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A distribution device for an agricultural sprayer connected to a plurality of product sources and including a plurality of spraying members, the distribution device comprising:
   a supply manifold having at least two inlets and at least one outlet, each inlet adapted to be linked to one of said product sources and each inlet cooperating with a closing valve;
   a distribution manifold having at least one inlet and at least two outlets, each outlet adapted to be linked to one of said spraying members and each outlet cooperating with a closing valve;
   a distribution conduit linking the at least one outlet of the supply manifold to the at least one inlet of the distribution manifold;
   a control mechanism including at least one camshaft carrying a plurality of cams associated with the closing valves of the inlets of the supply manifold and the closing valves of the outlets of the distribution manifold, each cam acting on opening and closing of a corresponding one of said closing valves of the supply manifold and the distribution manifold, the at least one camshaft being rotatably mounted between several angular positions such that the closing valves of the outlets of the distribution manifold and the closing valves of the inlets of the supply valves are actuated simultaneously by the at least one camshaft to allow supply of one of said spraying members by at least one of said product sources; and
   an actuating device for actuating the camshaft.

2. The distribution device according to claim 1, wherein the control mechanism includes a first camshaft that carries at least two cams, each cam of the first camshaft acting on one of said associated valves of the supply manifold, and a second camshaft that carries at least two cams, each cam of the second camshaft acting on one of said closing valves of the supply manifold, the first camshaft being linked in rotation to the second camshaft by a disengageable coupling system.

3. The distribution device according to claim 1, wherein the distribution conduit is equipped with a circulation pump operable to allow flow of products from said product sources up to said spraying members.

4. The distribution device according to claim 3, wherein the supply manifold and the distribution manifold form an integral part of the circulation pump.

5. The distribution device according to claim 1 further comprising a safety conduit that links the supply manifold to the distribution manifold, the safety conduit being equipped with a safety valve.

6. The distribution device according to claim 1 further comprising at least one regulating device for regulating a flow rate of product.

\* \* \* \* \*